United States Patent
Gennaro et al.

(10) Patent No.: US 7,922,493 B1
(45) Date of Patent: Apr. 12, 2011

(54) METHODS AND SYSTEMS FOR TRAINING SALES REPRESENTATIVES AND CONDUCTING ONLINE SALES CALLS

(75) Inventors: Norman Gennaro, San Carlos, CA (US); John Kowtko, Redwood City, CA (US); Paul Moran, Orinda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1626 days.

(21) Appl. No.: 10/370,552

(22) Filed: Feb. 20, 2003

Related U.S. Application Data

(63) Continuation-in-part of application No. 09/728,782, filed on Nov. 30, 2000, now abandoned.

(51) Int. Cl.
  *G09B 19/18* (2006.01)
(52) U.S. Cl. .......... 434/107; 434/118; 434/219; 705/26; 705/27; 705/29
(58) Field of Classification Search .................. 434/118, 434/219, 350, 322; 705/27, 28
  See application file for complete search history.

(56) References Cited

U.S. PATENT DOCUMENTS

| | | | | |
|---|---|---|---|---|
| 4,853,852 | A |  | 8/1989 | Rosen |
| 5,729,594 | A | * | 3/1998 | Klingman ................. 379/93.12 |
| 5,794,207 | A | * | 8/1998 | Walker et al. ..................... 705/1 |
| 5,809,145 | A | * | 9/1998 | Slik et al. ........................ 705/52 |
| 5,909,023 | A | * | 6/1999 | Ono et al. ..................... 235/380 |
| 5,930,764 | A |  | 7/1999 | Melchione |
| 5,950,173 | A | * | 9/1999 | Perkowski ....................... 705/26 |
| 5,983,227 | A | * | 11/1999 | Nazem et al. .................. 707/10 |
| 6,067,525 | A | * | 5/2000 | Johnson et al. ................. 705/10 |
| 6,067,568 | A | * | 5/2000 | Li et al. .......................... 709/223 |
| 6,125,356 | A | * | 9/2000 | Brockman et al. .............. 705/37 |
| 6,230,196 | B1 | * | 5/2001 | Guenthner et al. ........... 709/223 |
| 6,240,444 | B1 |  | 5/2001 | Fin et al. |
| 6,295,551 | B1 | * | 9/2001 | Roberts et al. ................ 709/205 |
| 6,297,819 | B1 |  | 10/2001 | Furst |
| 6,344,853 | B1 | * | 2/2002 | Knight .......................... 345/629 |
| 6,349,290 | B1 |  | 2/2002 | Horowitz et al. |
| 6,412,008 | B1 | * | 6/2002 | Fields et al. .................. 709/228 |
| 6,414,693 | B1 | * | 7/2002 | Berger et al. ................. 345/641 |
| 6,498,920 | B1 | * | 12/2002 | Simon .......................... 434/350 |

(Continued)

OTHER PUBLICATIONS

Oracle Corporation, "Oracle Sales and Marketing Connected Client User's Guide", Release 11, Mar. 1998.

*Primary Examiner* — Xuan M Thai
*Assistant Examiner* — Bruk A Gebremichael
(74) *Attorney, Agent, or Firm* — Kilpatrick Townsend & Stockton LLP

(57) ABSTRACT

Disclosed herein are integrated training and sales methods and systems for training sales representatives in making an online sales call to customers and for conducting the online sales call. The system includes a Web co-browsing tool, a voice channel between the customer and the sales representatives and a training and sales Web site that is simultaneously accessible, viewable and controllable by both the customer and the sales representative through the Web co-browsing tool. The training and sales Web site is structured so as to guide the sales representative and the customer through each step of the online sales call. The system may further include scripted talking points visible only to the sales representative, the scripted talking points prompting the sales representative to communicate information to the customer as the sales representative and the customer navigate through the training and sales Web site.

17 Claims, 10 Drawing Sheets

U.S. PATENT DOCUMENTS

| | | | |
|---|---|---|---|
| 6,542,897 B2* | 4/2003 | Lee | 707/102 |
| 6,697,825 B1* | 2/2004 | Underwood et al. | 715/207 |
| 6,850,896 B1 | 2/2005 | Kelman et al. | |
| 6,868,392 B1* | 3/2005 | Ogasawara | 705/26 |
| 6,868,395 B1* | 3/2005 | Szlam et al. | 705/27 |
| 6,961,910 B2 | 11/2005 | Lee et al. | |
| 6,965,868 B1* | 11/2005 | Bednarek | 705/9 |
| 6,970,838 B1* | 11/2005 | Kamath et al. | 705/26 |
| 6,973,483 B2* | 12/2005 | Hewett et al. | 709/213 |
| 6,975,622 B2 | 12/2005 | Korycki et al. | |
| 7,203,658 B1* | 4/2007 | Gidwani et al. | 705/26 |
| 7,315,830 B1* | 1/2008 | Wirtz et al. | 705/26 |
| 7,343,320 B1* | 3/2008 | Treyz et al. | 705/26 |
| 2001/0032140 A1* | 10/2001 | Hoffman | 705/26 |
| 2002/0016716 A1* | 2/2002 | Hong et al. | 705/1 |
| 2002/0046245 A1* | 4/2002 | Hillar et al. | 709/205 |
| 2002/0052799 A1* | 5/2002 | Starikov | 705/26 |
| 2002/0072974 A1* | 6/2002 | Pugliese et al. | 705/14 |
| 2002/0085025 A1* | 7/2002 | Busis et al. | 345/738 |
| 2002/0143898 A1* | 10/2002 | Mansfield et al. | 709/219 |
| 2002/0184359 A1* | 12/2002 | Kaneko et al. | 709/223 |
| 2003/0149635 A1* | 8/2003 | Burklow et al. | 705/26 |
| 2003/0167222 A1* | 9/2003 | Mehrotra et al. | 705/37 |
| 2006/0149653 A1* | 7/2006 | Davis et al. | 705/37 |

* cited by examiner

METHODS AND SYSTEMS FOR TRAINING SALES REPRESENTATIVES AND CONDUCTING ONLINE SALES CALLS

CROSS-REFERENCE TO RELATED APPLICATIONS

The present application is a continuation-in-part of application Ser. No. 09/728,782 entitled "Methods and Systems for Creating and Sharing Customized Web Sites and Portals", filed on Nov. 30, 2000 now abandoned.

BACKGROUND OF THE INVENTION

1. Field of the Invention

This invention relates to the creation and sharing of customized Web sites, particularly in the field of sales. More particularly, the present invention relates to the field of rapid prototyping of software demos and to the sales of goods and services (such as software, for example) over a computer network. The present invention also relates novel methods and systems for the execution of a sales cycle for such goods and services. In addition, the present invention relates to integrated methods and systems for training sales representatives and for conducting online sales calls.

2. Description of the Related Art

For most businesses, the cost of selling goods and services has a direct impact upon profitability. For large corporate entities employing hundreds or thousands of sales representatives, shortening the sales cycle (from initial contact with the potential customer to closing the deal) by even a single minute may directly translate into significant aggregate savings. Such savings may then be passed on to the customer or used to employ additional representatives to reach a broader segment of the market for such goods and services.

For enterprise software, such as application and database software for example, a conventional sales cycle may begin with an initial contact between the sales representative (hereafter "sales rep") and the potential customer. This contact may be initiated either by the sales rep or by the potential customer. During the initial contact, the sales rep may establish whether there is mutual interest in pursuing the nascent relationship and may match the needs of the potential customer with a solution offered by the enterprise software vendor. This initial contact is frequently carried out over the telephone. If it is established that the vendor offers a solution that addresses the potential customer's needs, the sales rep may prepare initial sales materials, such as a brief slide presentation, press releases and/or a demonstration of the software of interest to the potential customer. As shown in step S1 of FIG. 1, the sales rep, at the beginning of a typical sales cycle, may travel to the potential customer's site or may initiate a sales call to the potential customer. If there is mutual interest, the sales rep may prepare and show initial sales materials to the potential customer, as shown at S2. At various stages of the sales cycle, the sales rep may gather additional materials from existing corporate Web sites and may then email these additional materials to the potential customer, as outlined in step S3. This in turn, may necessitate multiple callbacks to the potential customer, as shown at S4.

As suggested at S5, the costly and time consuming steps of creating customized sales materials are conventionally deferred until later in the sales cycle; that is, until the sales rep determines that the lead is solid and that the potential customer is likely to purchase the product in question. If, as shown at S6, the sales rep determines that the likelihood of purchase is high, he or she usually requests others within the vendor's organization (i.e. a technical pre-sales representative, for example) to research and prepare the customized materials, such as a customized demo. In addition to the customized demo, the sales rep and/or the technical pre-sales representative may gather relevant references of other, similarly situated customers that use the featured product, among other possibilities. These customized materials are labor-intensive and may take several days to prepare, as the sales rep must call on a team of programmers to customize the product offered for sale to the potential customer. As shown in step S7, once these customer references, customized prototypes and other customized materials are made available, the sales rep typically must schedule another in person or online meeting with the potential customer to showcase these materials. These customized materials may take the sales rep and/or the technical pre-sales representative one to five days to prepare before they may be presented to the potential customer. Therefore, the sales rep often tries to close the deal before the potential customer asks for such customized materials.

Such a fragmented and drawn out approach to selling is antithetical to the modern trend of reducing the cost and time to close a sales cycle. What are needed, therefore, are methods and systems that enable the sales cycle to close in a shorter period of time and that enable a flexible execution thereof. What are also needed are methods and systems that enable a rapid customization, prototyping and demonstration of software over a computer network such as the Internet.

Sales representatives must be trained not only to have complete knowledge of the products or services they sell to customers, but also on the actual mechanics of the selling process itself. Often, the manner in which products or services are sold vary depending upon the product or service being offered. It is costly for large corporations to train knowledgeable sales representatives, especially so when the training they receive and the skills they develop in selling one product or service is not readily or fully portable to the selling of other products or services. Conventionally, a sales representative may be given training regarding a number of factors that may be of interest to the customer, training on effective presentation and sales techniques, efficacious demonstrations and other sales tools and techniques. It is conventionally up to the sales representative, thereafter, to pick and choose which of these will be presented to the customer. What is needed, therefore, is a standardized sales methodology and standardized sales tools and methods for selling goods and services to existing and potential customers. What are also needed are methods for providing customized demos for presentation to the customer within a standardized sales call framework. What is also needed is an integrated training and online sales call system that enables the sales representative to utilize the same tools for training purposes as he or she will use during an actual sales call to an existing or potential customer.

SUMMARY OF THE INVENTION

It is an object of the present invention, therefore, to provide methods and systems to provide a standardized sales methodology and standardized sales tools and methods for selling goods and services to existing and potential customers. It is another object of the present invention to provide methods for generating customized demos for presentation to the customer within a standardized sales call framework. A further object of the present invention is to provide an integrated training and online sales call system that enables the sales representative to utilize the same tools for training purposes as he or she will use during an actual sales call to an existing or potential customer.

In accordance with the above-described objects and those that will be mentioned and will become apparent below, an embodiment of an integrated system for training sales representatives in making an online sales call to a customer and for conducting the online sales call, includes a Web co-browsing tool, a voice channel between the customer and the sales representatives, a training and sales Web site that is simultaneously accessible, viewable and controllable by both the customer and the sales representative through the Web co-browsing tool, the training and sales Web site being structured so as to guide the sales representative and the customer through each step of a sales call and including a first section drawn to understanding needs of the customer; a second section drawn to issues and needs of the customer that should be considered; a third section that is configured to include at least one demo specific to the customer and drawn to a solution that addresses the customer's issues and needs and/or a fourth section that is configured to generate and store a demo of the solution, the demo being generic to the customer but specific to an industry, product, line of business and/or customer profile. Preferably, each of the first through fourth sections re accessible in any order by either the sales representative or the customer during the sales call.

According to further embodiments, the system may further include a demo building tool for building the customer generic demo, the demo building tool including a list of selectable solutions, a list of selectable industries, a list of selectable regions and/or a list of selectable job functions (for example). The building tool is preferably configured to generate the customer generic demo based upon a selection of the solutions, industries, regions and/or job functions by the sales representative and/or the customer. The training and sales Web site may further include at least one tab selected from the group consisting of a "Sales Call Online" portion of the Web site, an "Industry" portion of the Web site, a "Lines of Business" portion of the Web site, an "Information Technology" portion of the Web site, a "Products" portion of the Web site and a "Resources" portion of the Web site (for example). Each of the portions of the Web site may be structured to include the first to fourth sections. The present system may further include scripted talking points visible only to the sales representative, the scripted talking points prompting the sales representative to communicate information to the customer as the sales representative and the customer navigate through the training and sales Web site.

The present invention is also an integrated method of training sales representatives and selling a product or service online, including the steps of structuring a Web site according to a script for a sales call, the script of the sales call including a first phase drawn to understanding needs of the customer, a second phase drawn to understanding issues and needs of the customer that should be considered and a third phase drawn to showing the customer a demo specific to the customer or a demo that is generic to the customer but specific to at least one of an industry, product, line of business and customer profile; training a sales representative on the Web site, the Web site including a first section drawn to the first phase of the sales call, a second section drawn to the second phase of the sales call, a third section drawn to the third phase of the sales call, the third section being configured to include at least one demo specific to the customer and drawn to a solution that addresses the customer's issues and needs, and a fourth section also drawn to the third phase and that is configured include a demo of the solution that is generic to the customer but specific to an industry, product, line of business and/or customer profile (for example); initiating a sales call to a customer; pitching the product or service to the customer by the trained sales representative while co-browsing the Web site with the customer, the Web site including scripted talking points visible only to the sales representative, the talking points changing depending upon which of the first to fourth sections of the Web site is currently displayed to the sales representative and the customer, each of the first through fourth sections being accessible in any order by either the sales representative and the customer during the sales call; showing the customer a demo from at least one of the third and fourth sections of the Web site; and carrying out a scripted follow up of the sales call by (for example) sending a scripted email to the customer, calling the customer on the telephone and/or generating a revised demo and presenting the revised demo to the customer.

The Web site may further include a demo building tool for building the customer generic demo, the demo building tool including a list of selectable solutions, a list of selectable industries, a list of selectable regions and/or a list of selectable job functions (for example), the building tool being configured to generate the customer generic demo based upon a selection of a solution, industry, region and/or job function (for example) by the sales representative and/or the customer and wherein the demo showing step includes showing a demo generated by the demo building tool.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Functional Overview

Figure 2:
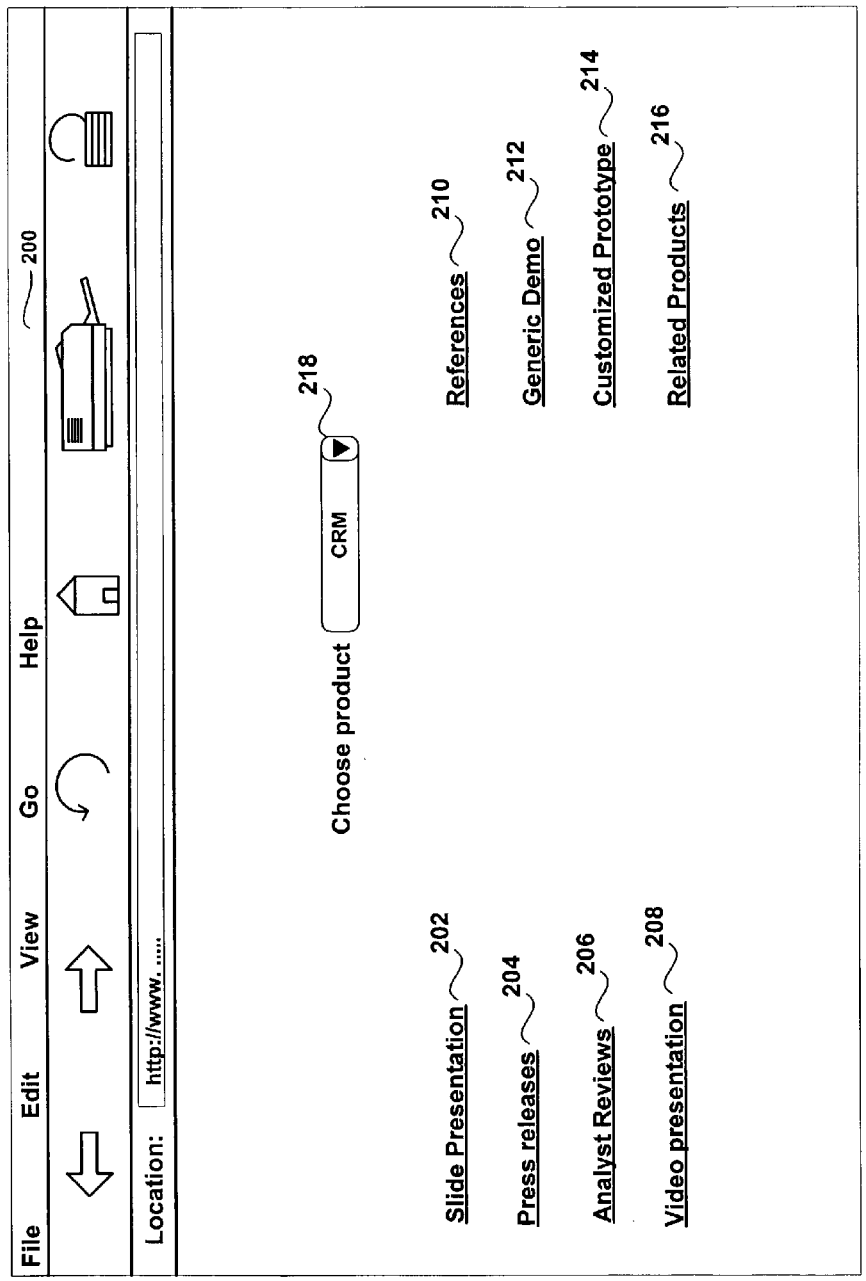
FIG. 2 is a representation of a browser display showing a Web site for conducting an online sales call, according to an embodiment of the present invention.

The present invention provides sales reps with effective tools for streamlining the sales cycle, from first contact with a potential customer to the sale of a product or service such as enterprise software. FIG. 2 shows one aspect of the present invention. As shown therein, an Internet browser 200 displays links to all materials that a sales rep may want to show to a potential customer during an entire sales cycle. Unlike conventional sales methodologies, the present invention provides for all sales materials to be aggregated into a single location, such as on a browser display. In this manner, the sales materials are immediately available to both the sales rep and the potential customer. Indeed, the browser display 200 shown in FIG. 2 (or one that is functionally similar to that shown in FIG. 2) is preferably displayed to both the sales rep and the potential customer at the same time. To do so, an Internet collaboration tool such as available from Webex.com may be used. The present invention, however, is not to be limited to such a proprietary platform, as any tool that enables the browser display 200 to be simultaneously visible and controllable to both potential customer and the sales rep over a computer network such as the Internet may be used within the context of the present invention. Moreover, the sales rep and the potential customer are advantageously coupled via a telephonic connection, to enable them to talk to one another as they navigate through the links shown in FIG. 2.

The sales materials that may be accessed through the browser display 200 include, for example, a three to five (for example) slide presentation 202 covering key business needs and an overview of the product and/or solution offered to address these identified key business needs. An architectural overview of the offered product/solution may also be included within the slide presentation 202. Press releases 204 describing the product or service offered may also be included. As shown at 206, analyst reviews and/or white papers may be included and displayed in the browser display 200, as may be references 210 from similarly situated customers that may have prior experience with the product or service offered. The references 210 may also include Web site URLs of other customers who have integrated the product or services offered into their own Web site. A link to a video presentation may also be present, as shown at 208. A static and generic product demo 212, including three to five (for example) screenshots of the product may also be provided. The static and generic demo 212 may advantageously include the primary workflow of the product or service offered and may outline the key differentiators of the product and/or solution relative to other offerings (if any) by competitors. A link to a customized prototype (a demo that has been customized to the potential customer's corporate identity and/or data, for example) may also be included, as shown at reference numeral 214, as described below relative to FIG. 3. Links to other related products may also be included, as shown at 216. For example, the related products link 216 may point to the sales rep's external company Web site and/or may deep link into the sales rep's company's e-Commerce store. Finally, a drop down menu or other product selector 218 may be present, enabling the sales rep and/or the potential customer to switch between product offerings, each offering preferably causing the display of like or similar links as those shown in FIG. 2. For illustrative purposes only, a Customer Relationship Management (CRM) product offering has been selected by either the sales rep or the potential client in FIG. 2. Not all of the links 202-218 need be present within the browser display 200. Similarly, some or all of the links identified in FIG. 2 may be replaced with links to other sales materials that are pertinent to the product and/or service offered by the sales rep.

Figure 1:
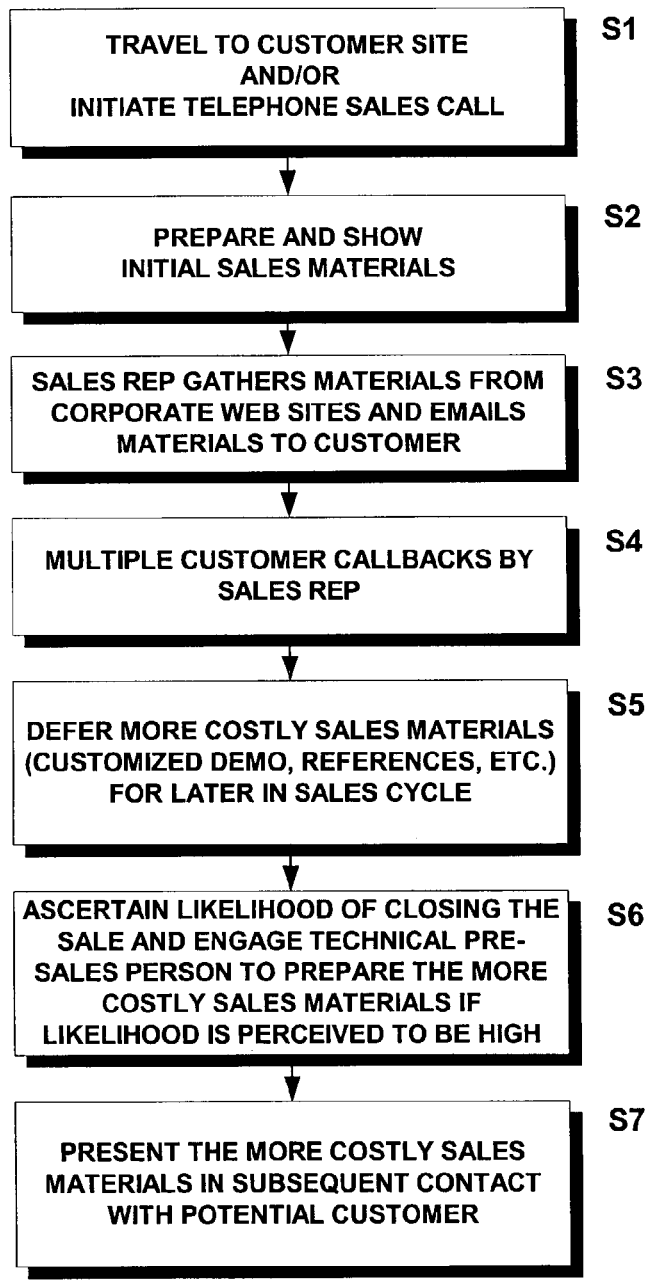
FIG. 1 is a flowchart of a conventional sales methodology.

This integrated approach to the presentation and organization of the sales materials enables the sales rep and/or the potential customer to access and view any of the above-described sales materials in any order. For example, and in contradistinction to the conventional method illustrated in FIG. 1, the sales rep or the potential customer may decide to begin with the customized prototype, which would conventionally not be prepared or shown to the potential customer until well into the relationship or sales cycle. Indeed, the customized prototype may demonstrate the functionality of the product in a concrete and graphic manner and show how such functionality may address the potential client's identified business goals. Preferably, the sales materials featured on the browser 200 require little or no advance preparation and little or no self-training on the potential customer's part. This allows the sales rep to deliver the content to the potential customer with a relatively high degree of confidence that the materials convey the intended meaning.

According to embodiments of the present invention, for a given product/solution, all of the sales materials featured within the browser display 200 are available (as URL links, for example) on a single Web page. Therefore, any one of the materials may be shown to the potential customer instantly, by simply clicking on the appropriate link with a pointing device, such as a mouse. If desired, one or more (or all) of the sales materials may be shown to the potential customer in a single interaction, advantageously enabling the sales rep and the potential client to progress through an entire sales cycle in a single step. Preferably, the display 200 is simultaneously visible and active to both the sales rep and the potential customer by means of a Web collaboration tool or the like. This enables either the sales rep or the potential customer to select and to view any of the materials 202-216 in any order, at a pace determined by the interactions between the sales rep and the potential customer.

Figure 3:
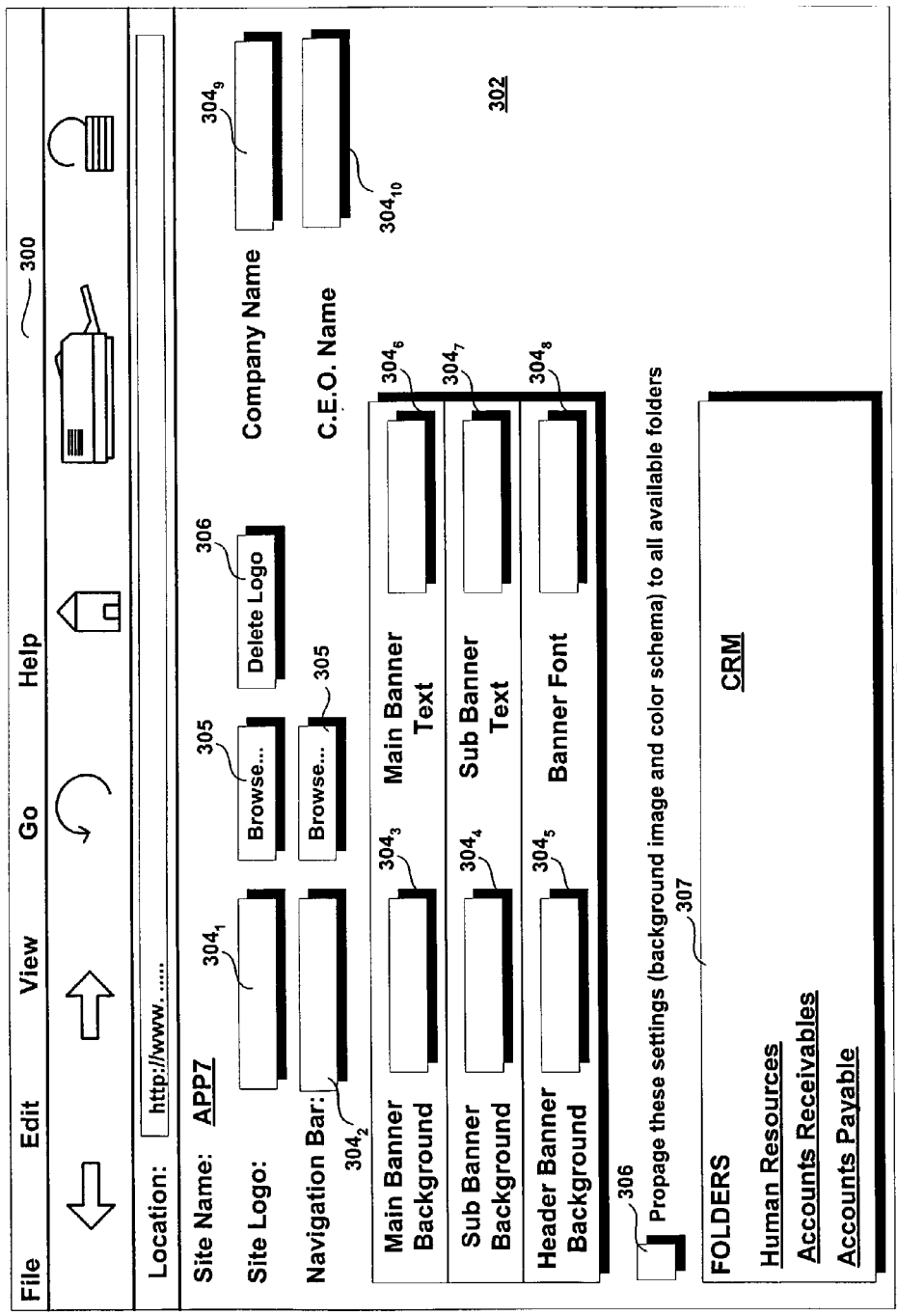
FIG. 3 is a representation of a browser display showing the control panel for creating customized Web sites and/or demos, according to another embodiment of the present invention.

FIG. 3 is a representation of a browser display 300 showing the control panel 302 for creating customized browser-based demos, Web sites or customized portals (gateways to other locations on the World Wide Web), according to another embodiment of the present invention. The customized Web sites may include intranet portals, extranet portals and/or application portals, for example. As shown therein, the control panel 302 includes input fields for a plurality of customizable attributes $304_1$ to $304_{10}$. It is to be understood that, although an arbitrary ten such customizable attributes $304_1$-$304_{10}$ are shown for illustrative purposes in FIG. 3, any number of such customizable attributes may be provided in the control panel 302. Inputting values, graphics, text and/or other configuration information into the input fields of the customizable attributes $304_1$-$304_{10}$ enables the customization of one or more selected generic Web site or portal templates. According to the present invention, these generic Web site or portal templates may be stored in a database (such as shown at 408 in FIG. 4), and thereafter selectively retrieved therefrom and customized by means of the customizable attributes $304_1$-$304_{10}$.

According to the present invention, the values, graphics, text and/or other configuration information inputted into the customizable attributes fields $304_1$-$304_{10}$ may be advantageously (but need not be) retrieved directly from the potential customer's own Web site. Indeed, these values, text and/or other configuration information (such as fonts, colors, animation, graphics, navigation bars, textures, etc.), for example, may be cut and pasted from the potential customer's own Web site and inputted directly into appropriate ones of the fields of the customizable attributes $304_1$-$304_{10}$ within the control panel 302. Thereafter, the selected generic Web site or portal template may be customized to the "look and feel" of the potential customer's existing Web site (for example) by re-generating the selected generic Web site or portal template with the values, text and/or other configuration information included therein. The customized portal or Web site may then be posted (to a Web collaboration tool, for example) and made available to the potential customer. Then end result is that a customized portal or Web site may be created in a short period of time (even while the potential customer is on the telephone with the sales rep) that resembles the look and feel or corporate identity of the potential customer's own Web site.

As shown in FIG. 3, these customizable attributes $304_1$-$304_{10}$ may include, for example, input fields for the potential customer's logo or other graphic, as shown at $304_1$. Such logo or graphic may include an image encoded as a .gif, a .jpg or a bitmapped image, for example. A button 305 may also be provided to enable the sales rep or other user to search a local or network drive (or a remote site, for example), for the desired graphic or logo. Another button 306 may be provided to delete the logo or graphic. A navigation bar taken from the potential customer's own Web site or selected from among pre-created exemplars may be inputted into the navigation bar customizable attribute input field $304_2$. The navigation bar, for example, may provide a link to a supplier of the potential customer, or may provide a link to another internal Web site. When providing a link to another company, the navigation bar may have the look and feel of the underlying company or organization. For example, a soft drink manufacturer may provide a customized navigation bar to its aluminum can supplier. A Browse button 305 may also be provided to enable the sales rep or control panel user to select a suitable navigation bar. Similarly, to customize the look of the selected generic portal or Web site template, values for the main banner background, sub banner background, header banner background, main banner text, sub banner text and/or banner font (for example) taken from the potential customer's Web site (for example) may also be inputted into the input fields identified in FIG. 3 by reference numerals $304_3$-$304_8$, respectively. The name and the Chief Executive Officer (CEO) of the potential customer's company (and/or any other relevant or compelling content) may also be inputted into the control panel 302, as shown at $304_9$-$304_{10}$. Of course, the customizable attributes $304_1$-$304_{10}$ shown in FIG. 3 are but examples of possible attributes that may be customized via the control panel 302, and the present invention should not be limited by such illustrative examples. Links to one or more folders, as shown at 307, may be included in the control panel 302. Such folders 307 may include links to one or more Web-enabled applications, such as, for example, a Human Resources Web application, Accounts Receivable or Payable applications or a CRM application that the sales rep may show to the potential customer. The values inputted into the input fields of the customizable attributes $304_1$-$304_{10}$ may be propagated to the applications listed in the folders 307 by selecting the button 306. This customizes the applications with the look and feel of the customer's own Web site and/or corporate identity. In this manner, the CRM application or a demo or prototype thereof, for example, may be quickly configured to match the potential customer's corporate identity. This enables the potential customer to immediately see how such applications would appear if they were purchased from the sales rep and integrated their own Web site. This customization mechanism allows the customization to be carried out prior to or even during a telephone conference with the potential customer and effectively heightens the immediacy and impact of the sales rep's presentation and increases the likelihood that the potential customer will actually purchase the featured product or products. After the customization of the portal and/or folders 307, the link 214 to the prototype may be made to point to the appropriate customized application (customized by means of the control panel 302), such as the CRM application selected at 218 in FIG. 2. The customized portal, web site or application may then be posted to a Web collaboration tool and simultaneously viewed and acted upon by both the sales rep and the potential customer.

Figure 4:
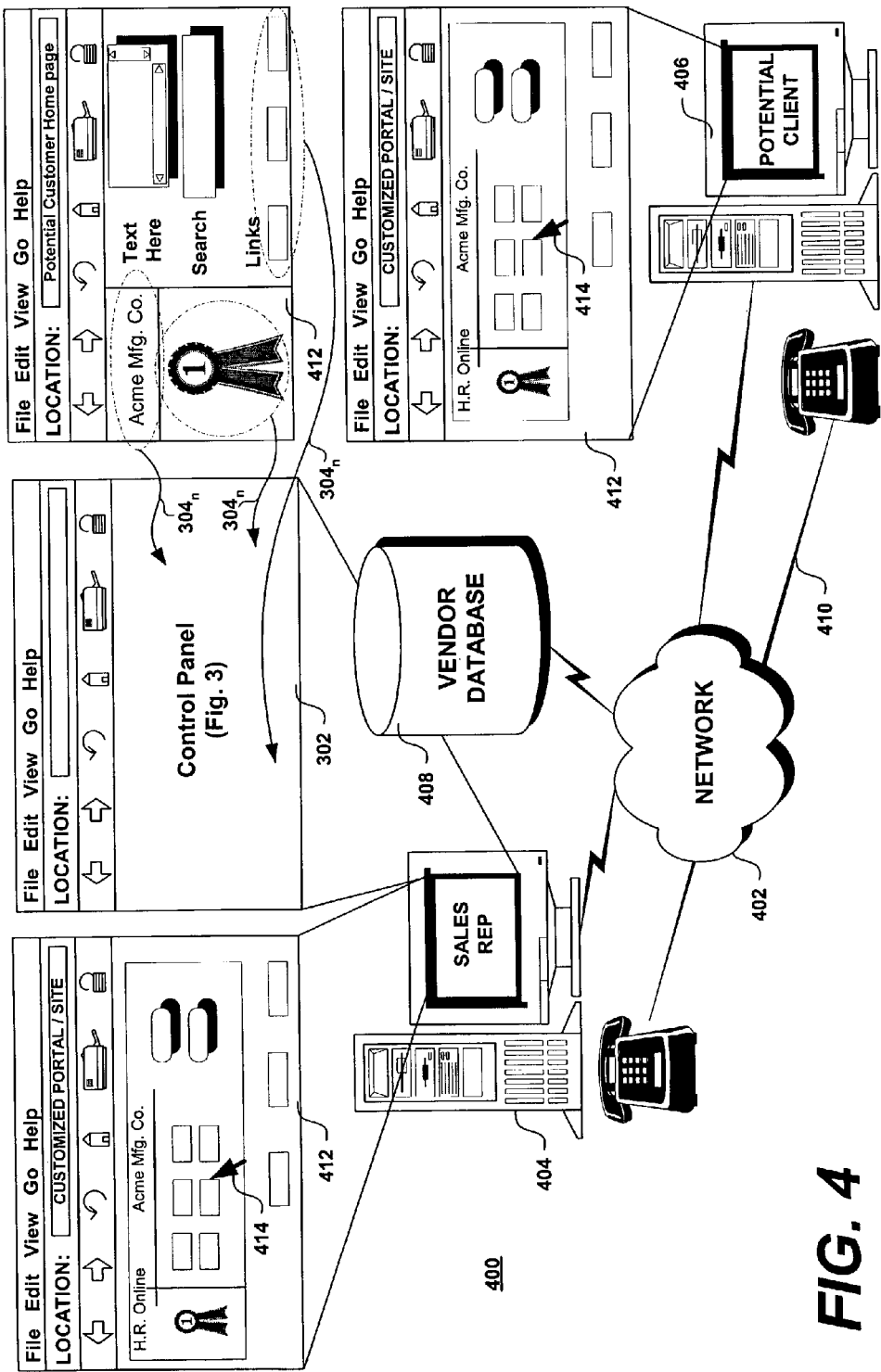
FIG. 4 is a diagram of a system for conducting online sales calls, according to a still further embodiment of the present invention.

FIG. 4 is a diagram of a system 400 for conducting online sales calls, according to a still further embodiment of the present invention. As shown therein, the system 400 may include a computer network 402 (including the Internet, a private network and/or a Virtual Private Network (VPN), for example), to which the sales rep and the potential customer (represented in FIG. 4 by computing devices 404 and 406, respectively) are coupled. Also coupled to the network 402 is a database 408. The database 408 may store the screen definitions of the Web applications shown in the folders 307, as well as the generic Web site and portal templates to which the customizable attributes $304_1$-$304_{10}$ are applied to generate the customized Web sites or portals according to the present invention. The choice of which generic Web site or portal template is selected may be driven by the content and/or layout that the customer seeks in their Web site or portal prototype. The sales rep and the potential customer may be in telephonic communication with one another during the entire sales cycle or portions thereof, as shown at 410. According to the present invention, the sales rep may access the potential customer's Web site 412, and retrieve therefrom selected graphics, text, fonts, color schemes and the like and input these into the control panel 302, as detailed above, as suggested by the arrows labeled $304_n$. The retrieved graphics, text, fonts, color schemes and the like may then be applied to one or more generic templates to create one or more customized Web sites or portals, as shown at 412. The customized Web site or portal 412 may then be posted to a Web collaboration tool or to some other utility that enables the customized portal or site 412 to be simultaneously visible and acted upon by both the sales rep 404 and the potential customer 406 over the network 402. Thereafter, any action carried out by the sales rep (by moving a cursor 414, for example) will be mirrored in the display visible to the potential customer. Similarly, any action carried out by the potential customer on the customized portal or Web site 412 will be seen by the sales rep. In this manner, the sales pitch becomes a collaborative experience between the sales rep and the potential customer, as either may drive the progression of the sales call and/or the order in which the sales materials are shown and discussed. The present invention is advantageously employed in a repository-based environment. In such a repository-based environment, applications may run by extracting screen display definitions from database tables at run time. By altering the customizable attributes described above, the appearance of the application may be altered the next time the application is executed.

According to another embodiment thereof, the present invention is an integrated system for training sales representatives and a sales methodology for sales representatives to follow in making online sales calls to customers or potential customers. The systems and methods of the present invention facilitate training sales representatives to sell (a software package, for example) to customers and once trained, to carry out actual sales calls to the customers. The present invention is based upon a guided sales approach in which the sales representative guides a customer or potential customer through a Web site and demos, which may feature a fully selectable range of customization. Alternatively, the present invention may be geared to a self-guided sales approach, in which the customer navigates a sales-oriented Web site independently of a sales representative.

The present invention, according to one embodiment thereof, includes a configurable training and sales Web site. The configurable training and sales Web site may function as a training tool for sales representatives as well a flexible selling tool enabling both the sales representative and the customer to drive the flow of an online sales call. The present configurable training and sales Web site is suitable for training sales representatives across a wide variety of solutions (e.g., products or services), industries and target customers. As such, it may function as a standardized infrastructure for training sales representatives in making effective sales calls and for enabling such sales representatives to conduct actual sales calls to offer most any solution to any customer and to do so in a manner that is relevant to the customer, all the while maintaining a standardized format and layout across industries, customer profiles, products and/or services. According to the present invention, the sales representative may make a sales pitch, show the customer relevant content and apply the shown content to a demo, all in a single online sales call or sales cycle. The demo may be generically configured to the type of content that is shown to the customer, pre-configured to the profile of the customer, pre-configured to a particular industry or to a particular job function or to the customer's company.

Figure 5:
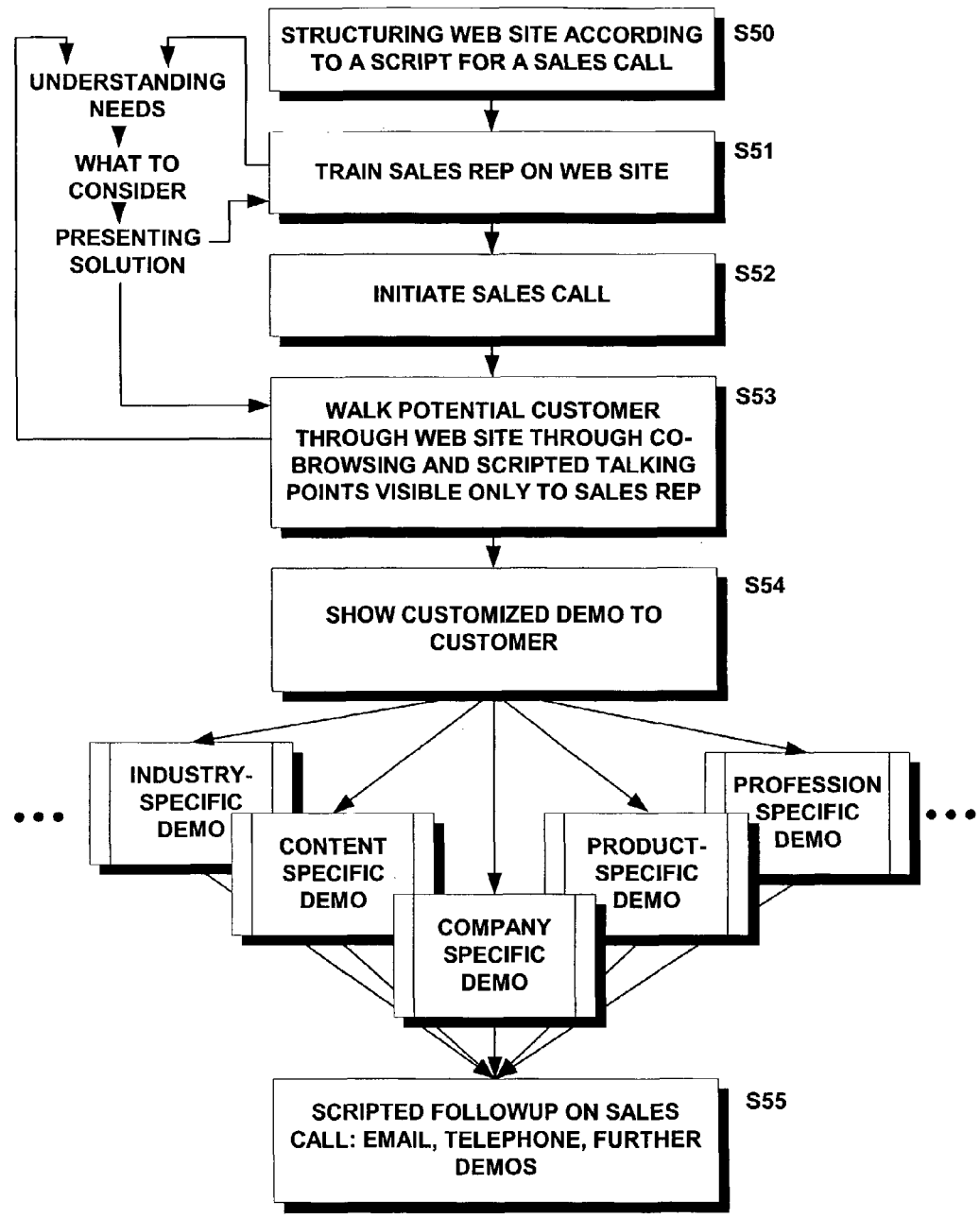
FIG. 5 is a flowchart of another embodiment of the present invention.

FIG. 5 is a flowchart of a method according to an embodiment of the present invention. As shown therein, step S50 calls for structuring the configurable training and sales Web site so as to reflect the script of a sales call. That is, according to embodiments of the present invention, each of the steps of a sales call finds counterpart structure in the present training and sales Web site. The structure of the Web site is further described relative to FIGS. 7-9. Although the present training and sales Web site may be variously structured to accommodate different selling philosophies and practices, the training and sales Web site is used, as shown at step S51, to train the sales representatives that will ultimately use the present training and sales Web site to familiarize himself or herself with the flow of a sales call and with the company's product line, as well as to conduct the actual online sales calls to existing or potential customers. The training, which is reflected in the structure of the present training and sales Web site, includes understanding the customer's needs, issues to consider and presenting the solution to the customer, the solution preferably addressing the previously-identified customer's needs and issues. The presenting of solutions may include the presentation of one or more demos, either generic or customized to whatever degree is required or advised. At step S52, the sales representative initiates a sales call to a customer. The sales call may be initiated, for example, by a telephone call and/or by the customer and the sales representative logging onto the present training and sales Web site through a Web co-browsing tool such as Webex®. When both the customer and the sales representative are logged onto the present training and sales Web site, the present site is simultaneously accessible, viewable and controllable by both or either of the customer and the sales representative. Step S53 calls for the sales representative to lead the customer through the training and sales Web site, optionally using scripted talking points visible only to the sales representative (rendered on a separate window on the sales representative's computer display screen, for example). Alternatively, the customer may take the lead and direct the flow of the sales call and the navigation through the present training and sales Web site. As during training, the structure of the present Web site and that of the scripted talking points may include understanding the customer's current and future needs, issues to consider in addressing the customer's needs and presenting a solution to the customer's needs such as, for example, a specific product or a suite of products or services. Step S53 is described in greater detail relative to FIG. 9. At step S54, the customer may be shown (at his or her request or at the suggestion of the sales representative) a demo of the solution being offered to the customer. The demo may range from a wholly generic demo of the solution to a demo that is fully customized to the customer's industry, the customer's content, the customer's company, product, job function and/or geographical region (for example). As called for by step S55, the sales representative, after having conducted the online sales call, may follow up according to a scripted sales call follow up protocol. Such a protocol may call for one or more telephone calls, emails and/or letters, for example.

Figure 9:
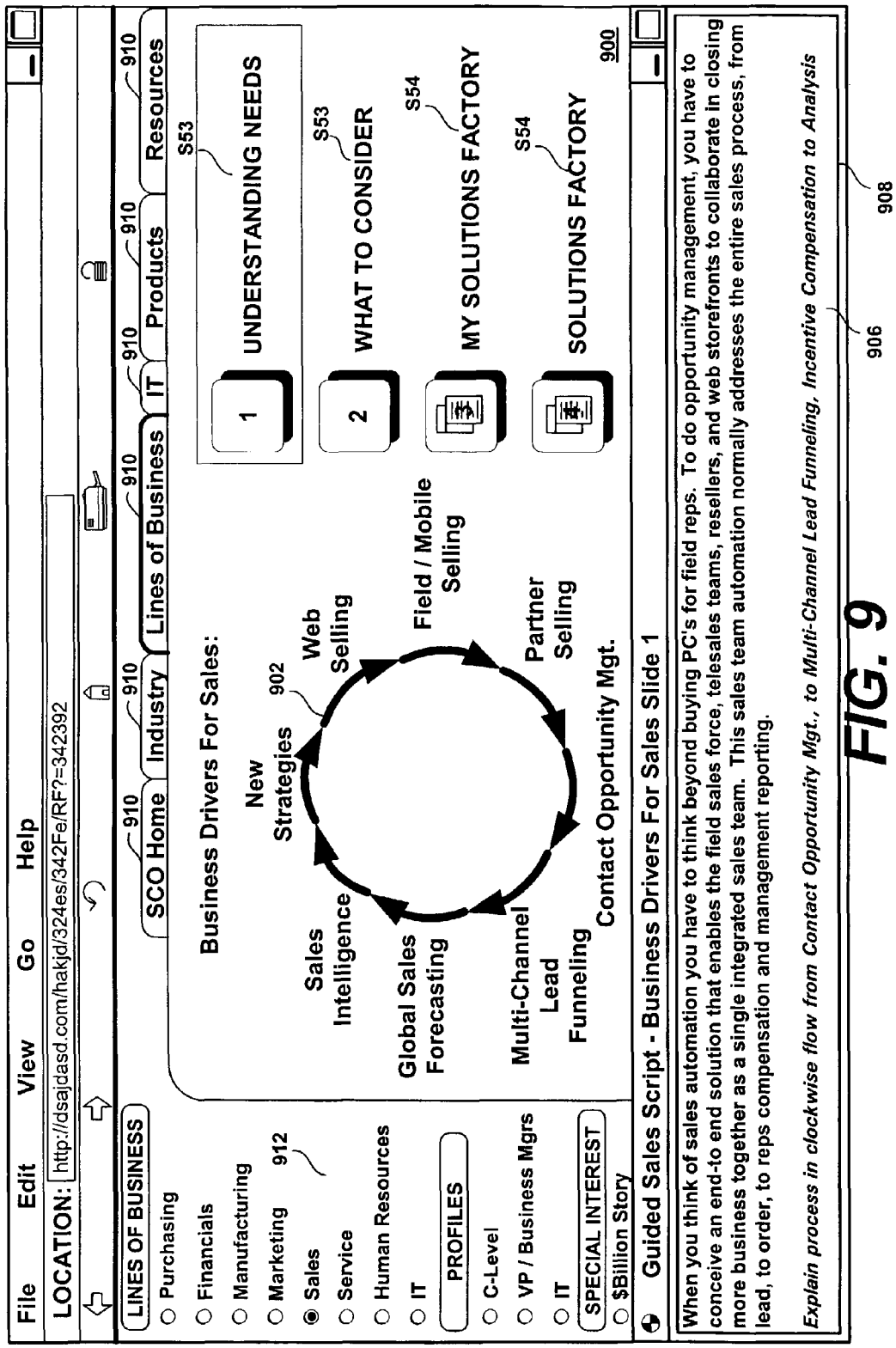
FIG. 9 is a representation of an illustrative page of the present training and sales Web site, as shown to both the customer and to the sales representative during a sales call co-browsing session, according to an embodiment of the present invention.

FIG. 9 is a representation of an illustrative page of the present training and sales Web site, as shown to both the customer and to the sales representative during a sales call co-browsing session, according to an embodiment of the present invention. FIG. 9 shows a Web site 900 according to the present invention that is simultaneously accessible, visible and controllable by both the sales representative and the customer. The Web site 900 may include, for example, a number of selectable tabs or links 910. Each of the tabs 910 is linked to a different part of the Web site 900. For example, the Web site 900 may a number of tabs 910, such as Sales Call Online (SCO) Home, Industry, Lines Of Business, Information Technology (IT), Products and Resources, for example. Each of these tabs 910 may be viewable and selectable by either the customer or the sales representative, depending upon the interest of the customer and the flow of the sales call. Within each part of the Web site 900 pointed to by the tabs 910, further selections may be available. According to an embodiment of the present invention, each part of the Web site 900 pointed to by the tabs 910 is organized in a similar manner. For example, the Web pages of the site 900 pointed to by the "Industry" tab 910 may also include a first section entitled "Understanding Needs" (for example), a second section entitled "What to Consider" (for example), a third section entitled "My Solutions Factory" (for example) and a fourth section entitled "Solutions Factory" (for example) sections. Consistency in the organization of the Web site 900 across all parts and sections thereof enables sales representatives to quickly become familiar with and proficient in using the Web site 900 to make sales calls and to close the deal, across product lines and across industries and customer profiles.

For example, within the "Lines of Business" portion of the Web site 900 (pictured in FIG. 9), the sales representative or the customer may select content customized to any one of a plurality of lines of business, such as shown at 912. As shown, such lines of business may include, for example, purchasing, financials, manufacturing, marketing, sales, service, human resources and IT (Information Technology). Selecting one of these lines of business 912 would bring the customer and the sales representative to a Web page of the site 900 whose content is customized to the selected line of business. For example, should the customer wish to view content aimed toward sales, the customer and the sales representative would be presented with a Web page aimed to the sales organization, that presents sales-related content and that presents special considerations of interest to sales forces.

In the exemplary illustration of FIG. 9, a graphic (such as the exemplary graphic 902) may be rendered on the Web site 900 when the "Understanding Needs" section and the "Sales" Line of Business 912 are selected. The exemplary graphic 902 may represent some of the needs of the customer as communicated by the customer to the sales representative or may advantageously represent aspects or needs that the customer may not even have previously considered. In FIG. 9, the exemplary graphic 902 represents business drivers for automating sales. Such drivers may include, for example, Web selling, field or mobile selling, contact opportunity management and the like. The sales representative may discuss each of these business drivers with the customer, or the customer may request further information from the sales representative on any of these drivers. Scripted talking points 906 may be presented in a separate window 908 that is visible only to the sales representative, and not to the customer. Such talking points 906 may prompt the sales representative with fully formed sentences to be repeated verbatim or may merely include bullets of points that should be touched upon during the course of or at the present juncture in the sales call. As such, the talking points 906 may form a constituent portion of a guided sales script to guide the sales representative through the various stages of an online sales call. A goal is to walk the customer through the training and sales Web site 900 (or to accompany the customer as he or she does the same) while providing timely and relevant information to the customer at each section of the Web site 900. After the sales representative has covered the points emphasized in the graphic 902, he or she may suggest to the customer that they proceed to the next section, entitled "What to Consider" in this embodiment and exemplary Web site 900. In this section, the sales representative may inform the customer of, for example, the desirable features of any product or service that addresses the customer's needs identified in the "Understanding Needs" section. The sales representatives may also inform the customer of other considerations that the customer may not have previously considered.

Thereafter, the sales call may proceed, as shown at S54 in FIG. 5, to a demonstration (demo) of the solution to the customer's needs, as previously identified. The demo may be generic or may be customized to any degree desired. The demo may be generated on the fly (that is, during the online sales call itself) or may have been previously generated by the sales representative and stored in anticipation of the online sales call with the customer. The demo shown to the customer may be accessed through the "My Solutions Factory" section or the "Solutions Factory" section. The "Solutions Factory" section may include a number of pre-configured demos that may be shown to the customer, as detailed herein above. Such demos may be generic to the customer (i.e., not customized for any particular customer) but may be particular to, for example, a particular line of business or to a particular industry or product. For example, the "Solutions Factory" section of the Web site 900 may include a demo of an application customized for the aerospace industry. Including the "Solutions Factory" section of the Web site 900 is advantageous, as it allows the sales representative to present pre-configured demos to prospective customers he or she may have cold-called (i.e., called without any prior contact). In the case of cold-calls, the sales representative may not have prepared any materials or demos specific to each prospective client, and the ability to retrieved pre-configured demos during a sales call in a co-browsing environment is a valuable selling tool.

The "My Solutions Factory" section (it being understood that such section may be differently titled or include different content), in contrast, may include pre-configured demos that the sales representative may have previously prepared for similar customers or that the customer may have previously viewed. The "My Solutions Factory" section may include, for example, customized demos that the sales representative may have previously prepared for a specific company or prospective customer.

Figure 6:
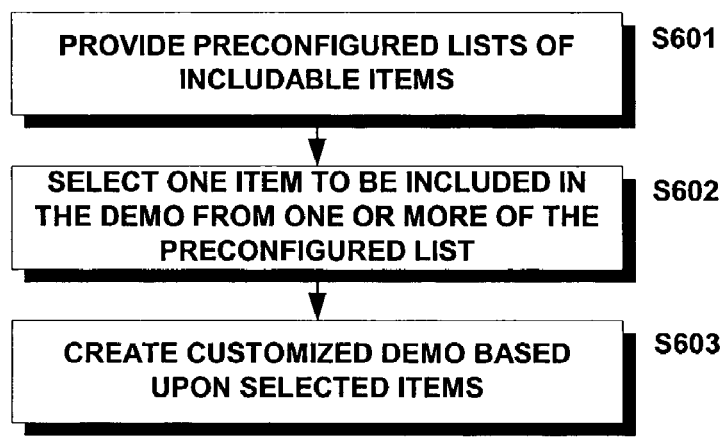
FIG. 6 is a flowchart of another aspect of the present invention.
Figure 7:
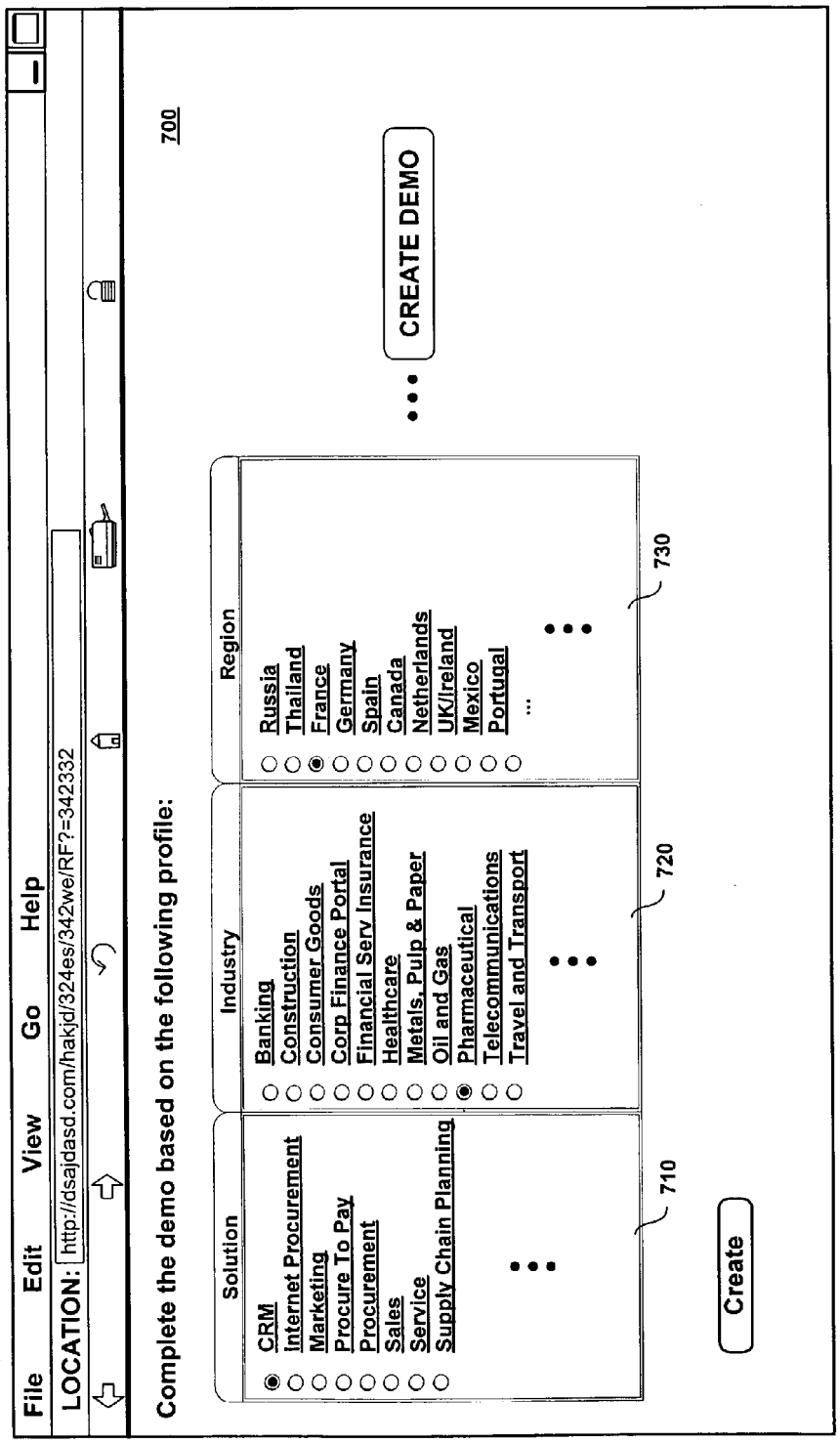
FIG. 7 is a representation of a building tool for generating customized demos, according to an embodiment of the present invention.

The demo presented to the customer may be customized to any degree desired. FIG. 6 is a flowchart of another aspect of the present invention. FIG. 7 is a representation of a demo-building tool 700 for generating customized demos, according to an embodiment of the present invention. Considering now FIGS. 6 and 7 collectively, the customized demo building tool 700 of the present invention may include a plurality of lists of includable items such as, for example, a list 710 of selectable solutions, a list 720 of selectable industries and a list 730 of selectable regions, as called for by step S601. The building tool 700, according to the present invention, is configured to generate a customized demo based upon a selection (step S602) of a solution, industry and/or region (among other possible selection criteria) by the sales representative and/or the customer during the co-browsing session or by the sales representative alone. In the exemplary situation illustrated in FIG. 7, the customer and/or the sales representative has selected Customer Relationship Management (CRM) as the Solution from the list 710, the pharmaceutical industry from the list 720 and France as the region in list 730. Other selection criteria and other pre-configured lists may be incorporated or substituted herein. As shown in the exemplary selections highlighted in FIG. 7, the demo to be retrieved (if previously generated and stored) or newly generated (step S603) will be drawn to CRM software for pharmaceutical companies in France. Other selections may be made and each different combination of selected items from the lists 710-730 may retrieve or generate a demo that is relevant to the selected combination. Alternatively, the present systems and methods may be configured to interactively pose questions to the customer to prompt the customer to select from a list 710 of selectable solutions, a list 720 of selectable industries and/or a list 730 of selectable regions, for example. The answers to such questions may then determine the content and character of the demo to be generated, in the manner discussed herein.

According to the present invention, the Web site 900 is preferably structured so as to emulate the script (e.g., organization, constituent steps) of a sales call. The sales methodology is built into the structure of the Web site 900. By navigating through the Web site 900, the sales representative is able to consistently and logically progress through a sales call, from initial contact, developing an interest in a product or services, exploring the important issues and considerations and presenting a demo drawn to the solution(s) that addresses these issues and considerations. Through the process of navigating with the customer through the first "Understanding Needs" section, the second "What to Consider" second, the third "My Solutions Factory" and fourth "Solutions Factory" sections of the Web site 900, the sales representative progresses through the preferred format of an online sales call, which format has proven itself to be an effective organization of content leading to a higher probability of making the sale.

Figure 8:
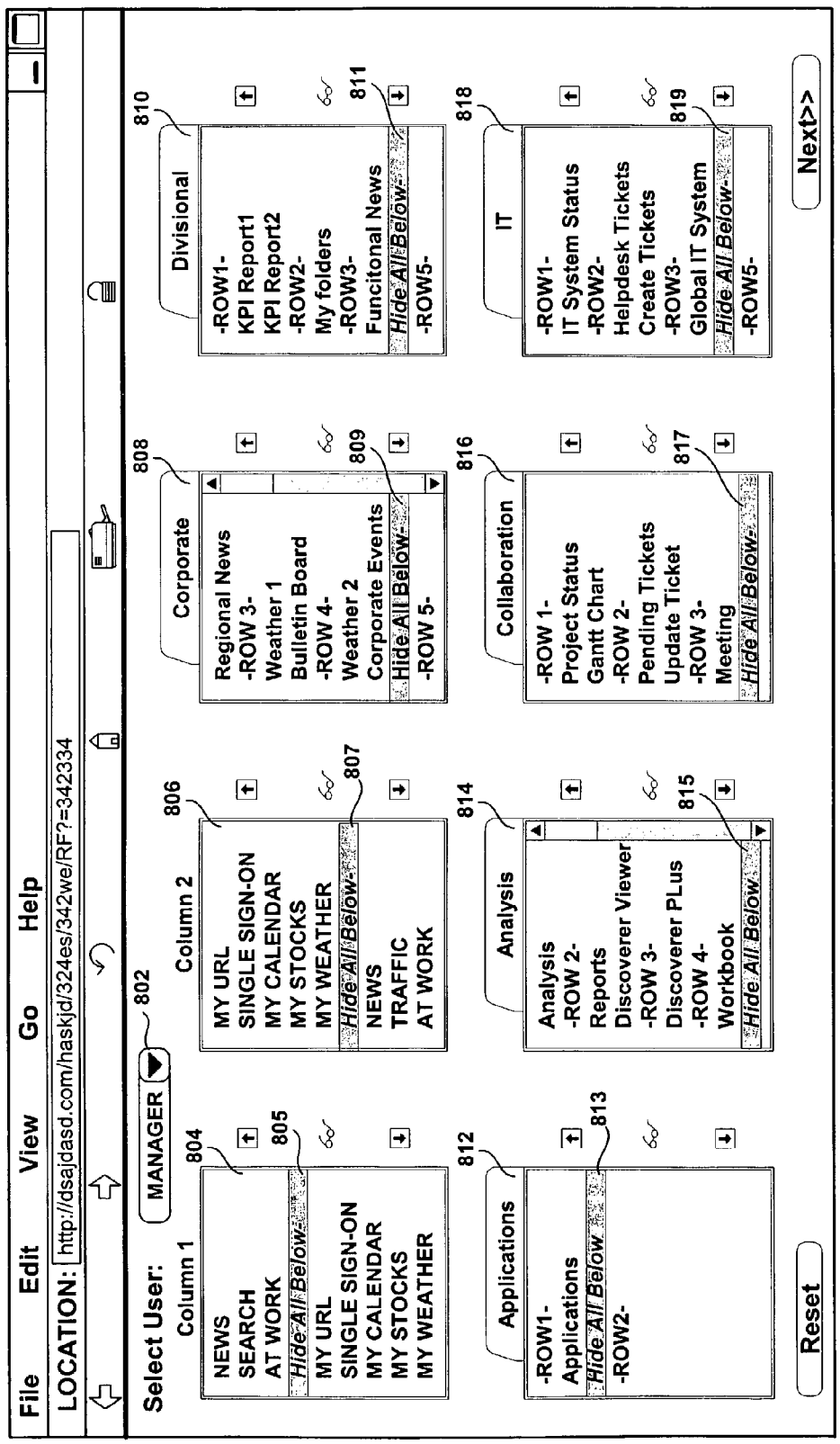
FIG. 8 is a representation of a setup screen for a customized demo, according to an embodiment of the present invention.

FIG. 8 is a representation of a setup screen 800 for a demo, according to another embodiment of the present invention. The demo may, for example, be included in the third section ("My Solutions Factory") of the present training and sales Web site, as shown at 900 in FIG. 9. The demo setup screen 800 may include a drop down list 802 to enable the salesperson (or the customer) to select his or her target audience or job function for the customized demo. For example, the drop down list 802 may enable the salesperson to select "Manager" (as shown) or other users, such as "C-Level executive", "Accountant", "Marketing VP" and the like. The setup screen 800 may also include a plurality of selection windows such as shown at, for example, reference numerals 804, 806, 808, 810, 812, 814, 816 and 818. Each of the selection windows 804, 806, 808, 810, 812, 814, 816 and 818 may be configured as a list of includable items and may include some mechanism 805, 807, 809, 811, 813, 815, 817 and 819 of selecting one or more of the includable items for inclusion in the demo. The selecting mechanism may be, as shown in FIG. 8, a "Hide All Below" bar that is movable within the selection windows 804, 806, 808, 810, 812, 814, 816 and 818 to select those includable items to be included within the demo. As shown, the includable items may be grouped according to categories, such as "Corporate", "Divisional", "Applications", "Analysis", "Collaboration" and "IT" (Information Technology), for example. Other categories may be added to or substitute for the categories listed above. Each of the includable items shown in FIG. 8, may correspond to an application, such as, for example, a JAVA language applet.

By selecting includable items using the selecting mechanism 805, 807, 809, 811, 813, 815, 817 and/or 819, the sales representative and/or the customer may customize the organization and layout of the demo. If the selecting mechanism 805, 807, 809, 811, 813, 815, 817 and 819 are positioned as shown in FIG. 8, the generated demo will include "News" box, a "Search" box and an "At Work" box in a first column 1 of the browser display, a "My URL" box, a "Single Sign On" box, a "My Calendar" box, a "My Stocks" box and a "My Weather" box in a second column of the browser display. As shown by the "Corporate" selection window 808, the demo to be generated will include regional news, weather for two geographic areas, a bulletin board and corporate events. Similarly, the "Divisional" selection window 810, the "Analysis" selection window 814, the "Collaboration" selection window 816 and the "IT" selection window indicate which of the selectable items will be included in the demo to be generated. Such a setup screen 800 enables the sales representative and/or the customer to customize not only the layout of the demo, but also its functionality. As this tool may be utilized in a Web co-browsing session, either the customer or the sales representative (or both) may select the items to be included in the demo to be generated.

Hardware Overview

Figure 10:
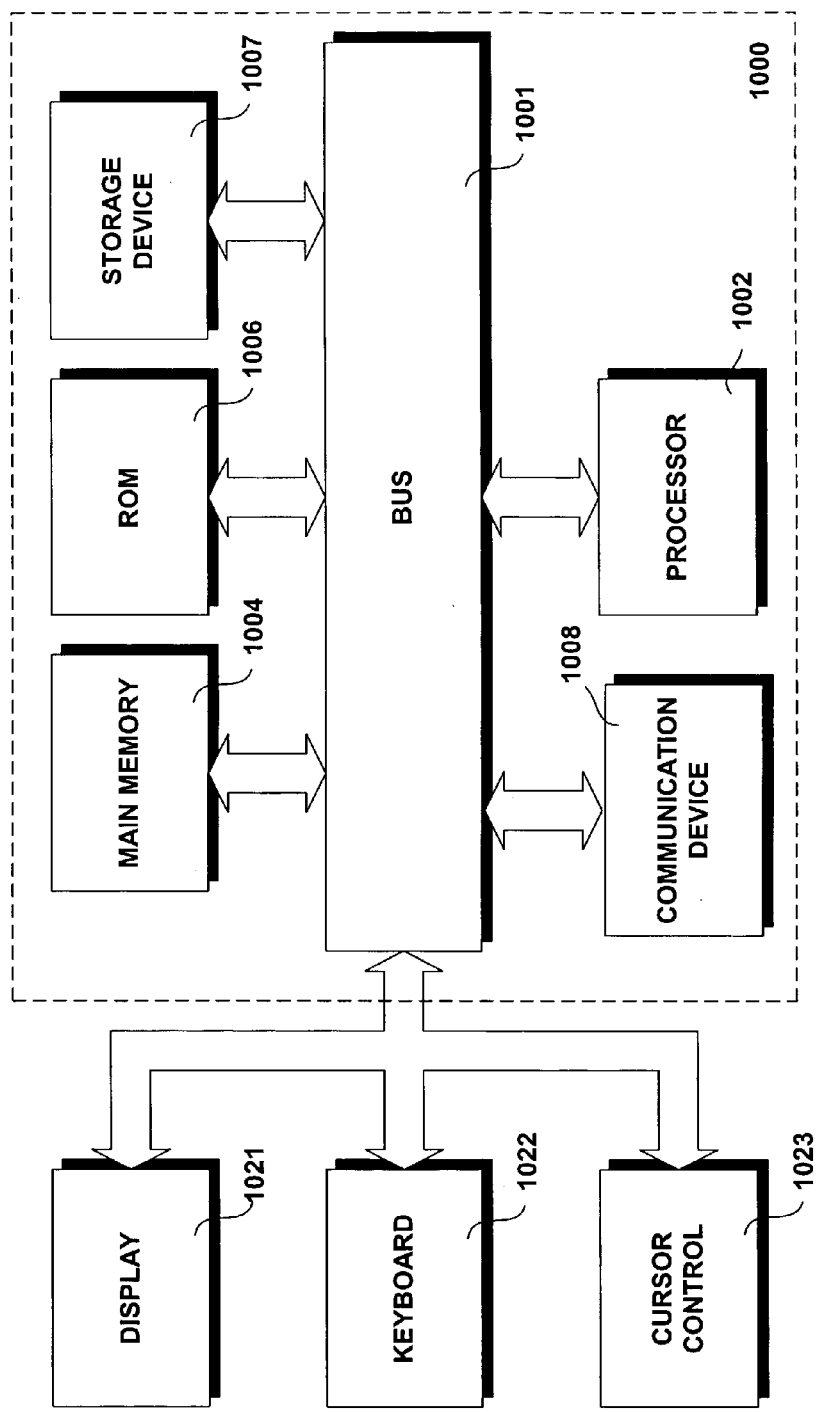
FIG. 10 is a block diagram of a computing device with which the present invention may be practiced.

FIG. 10 illustrates a block diagram of a computer 1000 with which an embodiment of the present invention may be implemented. Computer system 1000 includes a bus 1001 or other communication mechanism for communicating information, and a processor 1002 coupled with bus 1001 for processing information. Computer system 1000 further comprises a random access memory (RAM) or other dynamic storage device 1004 (referred to as main memory), coupled to bus 1001 for storing information and instructions to be executed by processor 1002. Main memory 1004 also may be used for storing temporary variables or other intermediate information during execution of instructions by processor 1002. Computer system 1000 also includes a read only memory (ROM) and/or other static storage device 1006 coupled to bus 1001 for storing static information and instructions for processor 1002. A data storage device 1007, such as a magnetic disk or optical disk, is coupled to bus 1001 for storing information and instructions. A communication device 1008 to connect the computer system to the network may also be coupled to the bus 1001, such as a modem or a network adapter.

Computer system 1000 may also be coupled via bus 1001 to a display device 1021, such as a cathode ray tube (CRT), for displaying information to a computer user. An alphanumeric input device 1022, including alphanumeric and other keys, is typically coupled to bus 1001 for communicating information and command selections to processor 1002. Another type of user input device is cursor control 1023, such as a mouse, a trackball, or cursor direction keys for communicating direction information and command selections to processor 1002 and for controlling cursor movement on display 1021. This input device typically has two degrees of freedom in two axes, a first axis (e.g., x) and a second axis (e.g., y), which allows the device to specify positions in a plane. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 1022, in which case all interactions therewith may be carried out via alternative input devices, such as a stylus and the written text may be interpreted using optical character recognition (OCR) techniques, for example.

The present invention is related to the use of computer system 1000 to provide methods and systems for selling products such as software online as well as for providing an integrated sales representative training and sales tool for conducting online sales calls. According to one embodiment, the methods according to the present invention are implemented by one or more computer systems 1000 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Indeed, those of skill in this art will recognize other alternative embodiments and all such embodiments are deemed to fall within the scope of the present invention. Thus, the present invention should be limited only by the claims as set forth below.

The invention claimed is:

1. An integrated system for training sales representatives of an organization in making online sales calls to customers and for conducting the online sales calls, the system comprising:
    a storage device storing a Web co-browsing tool accessible to a client computer associated with a sales representative of the organization and a client computer associated with a current or potential customer;
    a set of one or more communications devices providing at least a voice channel between the customer and the sales representative;
    one or more application server computers associated with the organization that host one or more web-enabled applications including web-enabled human resources application, web-enabled accounting application and web-enabled customer relationship management application offered as products or services of the organization;

one or more web server computers associated with the organization that host a training and sales Web site that is simultaneously accessible, viewable and controllable by both the customer and the sales representative through the Web co-browsing tool, the training and sales Web site being structured so as to guide the sales representative and the customer through each step of a sales call using the voice channel, the training and sales Web site comprising:
  a first section drawn to understanding needs of the customer during the sales call;
  a second section drawn to issues and needs of the customer that should be considered during the sales call;
  a third section that is configured to include one or more demonstrations of the web-enabled applications offered as products or services of the organization that are specific to the customer, the one or more demonstrations specific to the customer generated during the sales call from one or more of the one or more web-enabled applications including the web-enabled human resources application, the web-enabled accounting application and the web-enabled customer relationship management application hosted by the one or more application server computers selected by at least one of the sales representative and the customer during the sales call and drawn to a solution provided in part by the one or more selected web-enabled applications including the web-enabled human resources application, the web-enabled accounting application and the web-enabled customer relationship management application that addresses the customer's issues and needs, the third section providing the one or more demonstrations specific to the customer generated from the one or more selected web-enabled applications including the web-enabled human resources application, the web-enabled accounting application and the web-enabled customer relationship management application to the customer as if integrated into a Web site associated with the customer; and
  a fourth section that is configured to include one or more demonstrations of the web-enabled applications offered as products or services of the organization that are generic to the customer but specific to at least one of an industry, product, line of business and customer profile of the customer, the one or more demonstrations generic to the customer but specific to at least one of an industry, product, line of business and customer profile of the customer generated during the sales call from one or more of the one or more web-enabled applications including the web-enabled human resources application, the web-enabled accounting application and the web-enabled customer relationship management application hosted by the one or more application server computers selected by at least one of the sales representative and the customer during the sales call;
wherein each of the first through fourth sections are accessible in any order by either the sales representative or the customer during the sales call;
wherein the one or more web server computers hosting the training and sales Web site that is simultaneously accessible, viewable and controllable by both the customer and the sales representative through the Web co-browsing tool are in communication with the one or more application server computers; and
wherein the one or more application server computers, the one or more web server computers are configured to:
  receive, via a control panel associated with the third section of the training and sales Web site, at least one of values, text, and graphics copied by at least one of the sales representative and the customer during the sales call from an existing web site of the customer into a plurality of input fields provide by the control panel, the control panel simultaneously accessible, viewable and controllable by both the sales representative and the customer;
  generate the one or more demonstrations specific to the customer based on customizing the one or more selected web-enabled applications including the web-enabled human resources application, the web-enabled accounting application and the web-enabled customer relationship management application with a template associated with the web-enabled applications including the web-enabled human resources application, the web-enabled accounting application and the web-enabled customer relationship management application to a corporate identity of the customer with the at least one of values, text, and graphics copied from an existing web site of the customer into the plurality of input fields;
  post the one or more demonstrations specific to the customer to the training and sales Web site in response to updating the third section of the training and sales Web site;
  post the one or more demonstrations generic to the customer but specific to at least one of an industry, product, line of business and customer profile of the customer to the training and sales Web site in response to updating the fourth section of the training and sales Web site; and
  communicate to the customer during the sales call one or more views of the one or more selected web-enabled applications including the web-enabled human resources application, the web-enabled accounting application and the web-enabled customer relationship management application hosted by the one or more application servers showing the customer the one or more selected web-enabled applications including the web-enabled human resources application, the web-enabled accounting application and the web-enabled customer relationship management application via the third section of the Web site in the one or more demonstrations of the web-enabled applications offered as products or services of the organization that are specific to the customer and via the fourth section of the Web site in the one or more demonstrations of the web-enabled applications offered as products or services of the organization that are generic to the customer but specific to at least one of an industry, product, line of business and customer profile of the customer.

2. The system of claim 1, further including a storage device storing a demo building tool for building the application one or more demonstrations of the web-enabled applications offered as products or services of the organization that are specific to the customer or the one or more demonstrations of the execution of software applications offered as products or services of the organization that are generic to the customer but specific to at least one of an industry, product, line of business and customer profile of the customer from the one or more selected web-enabled applications including the web-enabled human resources application, the web-enabled accounting application and the web-enabled customer relationship management application, the demo building tool including at least one of a list of selectable solutions, a list of selectable industries, a list of selectable regions and a list of selectable job functions, the building tool being configured to generate the one or more demonstrations specific to the customer or the one or more demonstrations generic to the customer from the one or more selected web-enabled applications including the web-enabled human resources application, the web-enabled accounting application and the web-enabled customer relationship management application based upon a selection of at least one of the solutions, industries, regions and job functions by the sales representatives and/or the customer.

3. The system of claim 1, wherein the training and sales Web site further includes at least one tab selected from the group consisting of a "Sales call Online" portion of the Web site, an "Industry" portion of the Web site, a "Lines of Business" portion of the Web site, an "Information Technology" portion of the Web site, a "Products" portion of the Web site and a "Resources" portion of the Web site.

4. The system of claim 3, wherein each of the portions of the Web site is structured to include the first to fourth sections.

5. The system of claim 1, wherein the training and sales Web site further includes scripted talking points visible only to the sales representative, the scripted talking points prompting the sales representative to communicate information to the customer during the sales call as the sales representative and the customer navigate through the training and sales Web site.

6. A method of training sales representatives of an organization and selling online a product or service offered by the organization online, the method comprising:
receiving, at one or more web server computers associated with the organization, information structuring a Web site according to a script for a sales call with customers, the script of the sales call including a first phase drawn to understanding needs of the customers, a second phase drawn to understanding issues and needs of the customers that should be considered and a third phase drawn to showing the customers demonstrations of web-enabled applications offered as products or services of the organization that are specific to the customers and demonstrations of web-enabled applications offered as products or services of the organization that are generic to the customers but specific to at least one of an industry, product, line of business and customer profile, the demonstrations specific to the customers and the demonstrations generic to the customers generated from at least one of one or more web-enabled applications including web-enabled human resources application, web-enabled accounting application and web-enabled customer relationship management application offered as products or services of the organization selected by at least one of the sales representatives and the customers, the one or more web-enabled applications including the web-enabled human resources application, the web-enabled accounting application and the web-enabled customer relationship management application offered as products or services of the organization hosted by one or more application server computers associated with the organization that communicate with the one or more web server computers;
receiving, at the one or more web server computers, information from a client computer associated with a sales representative of the organization indicative of a training by the sales representative on the Web site, the Web site including a first section drawn to the first phase of the script, a second section drawn to the second phase of the script, a third section drawn to the third phase of the script, the third section being configured to include one or more training demonstrations of the web-enabled applications offered as products or services of the organization that are specific to target customers, the one or more training demonstrations specific to the target customers generated from at least one of the one or more web-enabled applications including the web-enabled human resources application, the web-enabled accounting application and the web-enabled customer relationship management application hosted by the one or more application server computers and drawn to solutions provided in part by the one or more web-enabled applications including the web-enabled human resources application, the web-enabled accounting application and the web-enabled customer relationship management application that address the target customers' issues and needs, and a fourth section also drawn to the third phase and that is configured to include one or more demonstrations of the web-enabled applications offered as products or services of the organization that are generic to the target customers but specific to at least one of an industry, product, line of business and customer profiles of the target customers, the one or more demonstrations generic to the target customers but specific to at least one of an industry, product, line of business and customer profiles of the target customers generated from at least one of the one or more web-enabled applications including the web-enabled human resources application, the web-enabled accounting application and the web-enabled customer relationship management application hosted by the one or more application server computers
providing, with the one or more web server computers, co-browsing of the Web site with the trained sales representative and a customer subsequent to initiating a sales call to the customer, the Web site responsively including scripted talking points visible only to the sales representative, the talking points changing depending upon which of the first to fourth sections of the Web site is currently displayed to the sales representative and the customer, each of the first through fourth sections being accessible in any order by either the sales representative and the customer during the sales call;
generating, with the one or more web server computers, one or more demonstrations of the web-enabled applications offered as products or services of the organization that are generic to the customer but specific to at least one of an industry, product, line of business and customer profile of the customer from a web-enabled applications including the web-enabled human resources application, the web-enabled accounting application and the web-enabled customer relationship management application selected by at least one of the customer and the sales representative through the Web co-browsing tool from the one or more web-enabled applications including the web-enabled human resources application, the web-enabled accounting application and the web-enabled customer relationship management application hosted by the one or more application server computers;
posting to the Web site, with the one or more web server computers, the one or more demonstrations generic to the customer but specific to at least one of an industry, product, line of business and customer profile of the customer generated from the selected web-enabled applications including the web-enabled human resources application, the web-enabled accounting application and the web-enabled customer relationship management application to the fourth section of the Web site;

receiving, at the one or more web server computers, at least one of values, text, and graphics provided via a control panel associated with the third section of the Web site and copied by the sales representative or the customer during the sales call from an existing web site of the customer into a plurality of input fields provide by the control panel, the control panel simultaneously accessible, viewable and controllable by both the sales representative and the customer;

generating, with the one or more web server computers one or more demonstrations of the web-enabled applications offered as products or services of the organization that are specific to the customer from the selected web-enabled applications including the web-enabled human resources application, the web-enabled accounting application and the web-enabled customer relationship management application whose corresponding one or more demonstrations being generic to the customer but specific to at least one of an industry, product, line of business and customer profile of the customer are available in the fourth section of the Web site based on customizing the selected web-enabled applications including the web-enabled human resources application, the web-enabled accounting application and the web-enabled customer relationship management application with a template associated with the selected web-enabled applications including the web-enabled human resources application, the web-enabled accounting application and the web-enabled customer relationship management application to a corporate identity of the customer with the at least one of values, text, and graphics copied from an existing web site of the customer into the plurality of input fields;

posting, with the one or more web server computers, the application one or more demonstrations specific to the customer generated from the selected web-based applications including the web-enabled human resources application, the web-enabled accounting application and the web-enabled customer relationship management application to the third section of the Web site;

communicating, from the one or more web server computers to the client computer associated with the sales representative and a client computer associated with the customer, one or more views of the selected web-based applications including the web-enabled human resources application, the web-enabled accounting application and the web-enabled customer relationship management application hosted by the one or more application server computers showing the customer the selected web-enabled applications including the web-enabled human resources application, the web-enabled accounting application and the web-enabled customer relationship management application via the third section of the Web site in the one or more demonstrations of the web-enabled applications offered as products or services of the organization that are specific to the customer and via the fourth section of the Web site in the application one or more demonstrations of the web-enabled applications offered as products or services of the organization that are generic to the customer but specific to at least one of an industry, product, line of business and customer profile of the customer; and communicating, from the one or more web server computers to the client computer associated with the sales representative, information for carrying out a scripted follow up of the sales call by carrying out at least one of sending a scripted email to the customer, calling the customer on the telephone and generating at least one revised demonstration of the web-enabled applications offered as products or services of the organization and presenting the revised demonstration to the customer.

7. The method of claim 6, wherein the Web site further includes a dome building tool for building the one or more demonstrations specific to the customer or the one or more demonstrations generic to the customer but specific to at least one of an industry, product, line of business and customer profile of the customer from the selected web-enabled applications including the web-enabled human resources application, the web-enabled accounting application and the web-enabled customer relationship management application, the dome building tool including at least one of a list of selectable solutions, a list of selectable industries, a list of selectable regions and a list of selectable job functions, the building tool being configured to generate the one or more demonstrations specific to the customer or the one or more demonstrations generic to the customer but specific to at least one of an industry, product, line of business and customer profile of the customer from the selected web-enabled applications including the web-enabled human resources application, the web-enabled accounting application and the web-enabled customer relationship management application based upon a selection of at least one of a solution, industry, region and job function by the sales representative and/or the customer.

8. A non-transitory computer-readable storage medium storing instructions executable by a computer system for training sales representatives of an organization and selling online a product or service offered by the organization the non-transitory computer-readable storage medium comprising:

instructions for receiving information structuring a Web site hosted by one or more web server computers associated with the organization according to a script for a sales call with customers, the script of the sales call including a first phase drawn to understanding needs of the customers, a second phase drawn to understanding issues and needs of the customers that should be considered and a third phase drawn to showing the customers demonstrations of web-enabled applications offered as products or services of the organization that are specific to the customers and demonstrations of web-enabled applications offered as products or services of the organization that are generic to the customers but specific to at least one of an industry, product, line of business and customer profile, the demonstrations specific to the customers and the demonstrations generic to the customers generated from at least one of one or more web-enabled applications including web-enabled human resources application, web-enabled accounting application and web-enabled customer relationship management application offered as products or services of the organization selected by at least one of the sales representatives and the customers, the one or more web-enabled applications including the web-enabled human resources application, the web-enabled accounting application and the web-enabled customer relationship management application offered as products or services of the organization hosted by one or more application server computers associated with the organization that communicate with the one or more web server computers;

instructions for receiving information indicative of a training by a sales representative of the organization on the Web site, the Web site including a first section drawn to the first phase of the script, a second section drawn to the second phase of the script, a third section drawn to the third phase of the script, the third section being configured to include one or more training demonstrations of the web-enabled applications offered as products or services of the organization that are specific to target customers, the one or more training demonstrations specific to the target customers generated from at least one of the one or more web-enabled applications including the web-enabled human resources application, the web-enabled accounting application and the web-enabled customer relationship management application hosted by the one or more application server computers and drawn to solutions provided in part by the one or more web-enabled applications including the web-enabled human resources application, the web-enabled accounting application and the web-enabled customer relationship management application that address the target customers' issues and needs, and a fourth section also drawn to the third phase and that is configured to include one or more target demonstrations of the web-enabled applications offered as products or services of the organization that are that are generic to the target customers but specific to at least one of an industry, product, line of business and customer profiles of the target customers, the one or more demonstrations generic to the target customers but specific to at least one of an industry, product, line of business and customer profiles of the target customers generated from at least one of the one or more web-enabled applications including the web-enabled human resources application, the web-enabled accounting application and the web-enabled customer relationship management application hosted by the one or more application server computers;

instructions for providing co-browsing of the Web site with the trained sales representative and a customer subsequent to initiating a sales call to the customer, the Web site responsively including scripted talking points visible only to the sales representative, the talking points changing depending upon which of the first to fourth sections of the Web site is currently displayed to the sales representative and the customer, each of the first through fourth sections being accessible in any order by either the sales representative and the customer during the sales call;

instructions for generating one or more demonstrations of the web-enabled applications offered as products or services of the organization that are generic to the customer but specific to at least one of an industry, product, line of business and customer profile of the customer from a web-enabled applications including the web-enabled human resources application, the web-enabled accounting application and the web-enabled customer relationship management application selected by at least one of the customer and the sales representative through the Web co-browsing tool from the one or more web-enabled applications including the web-enabled human resources application, the web-enabled accounting application and the web-enabled customer relationship management application hosted by the one or more application server computers;

instructions for posting to the Web site the one or more demonstrations generic to the customer but specific to at least one of an industry, product, line of business and customer profile of the customer generated from the selected web-enabled applications including the web-enabled human resources application, web-enabled accounting application and the web-enabled customer relationship management application to the fourth section of the Web site;

instructions for receiving at least one of values, text, and graphics provided via a control panel associated with the third section of the Web site and copied by the sales representatives or the customer during the sales call from an existing web site of the customer into a plurality of input fields provide by the control panel, the control panel simultaneously accessible, viewable and controllable by both the sales representative and the customer;

instructions for generating one or more demonstrations of the web-enabled applications offered as products or services of the organization that are specific to the customer from the selected web-enabled applications including the web-enabled human resources application, the web-enabled accounting application and the web-enabled customer relationship management application whose corresponding one or more demonstrations being generic to the customer but specific to at least one of an industry, product, line of business and customer profile of the customer are available in the fourth section of the Web site based on customizing the selected web-enabled applications including the web-enabled human resources application, the web-enabled accounting application and the web-enabled customer relationship management application with a template associated with the selected web-enabled applications including the web-enabled human resources application, the web-enabled accounting application and the web-enabled customer relationship management application to a corporate identity of the customer with the at least one of values, text, and graphics copied from an existing web site of the customer into the plurality of input fields;

instructions for posting the one or more demonstrations specific to the customer generated from the selected web-based applications including the web-enabled human resources application, the web-enabled accounting application and the web-enabled customer relationship management application to the third section of the Web site;

instructions for communicating one or more views of the selected web-enabled applications including the web-enabled human resources application, the web-enabled accounting application and the web-enabled customer relationship management application hosted by the one or more application server computers showing the customer the selected web-enabled applications including the web-enabled human resources application, web-enabled accounting application and the web-enabled customer relationship management application via the third section of the Web site in the one or more demonstrations of the web-enabled applications offered as products or services of the organization that are specific to the customer and via the fourth section of the Web site in the one or more demonstrations of the web-enabled applications offered as products or services of the organization that are generic to the customer but specific to at least one of an industry, product, line of business and customer profile of the customer; and instructions for communicating to the client computer associated with the sales representative, information for carrying out a scripted follow up of the sales call by carrying out at least one of sending a scripted email to the customer, calling the customer on the telephone and generating at least one revised demonstration of the web-enabled applications offered as products or services of the organization and presenting the revised demonstration to the customer.

9. The non-transitory computer-readable storage medium of claim 8, wherein the Web site further includes a demo building tool for building the one or more demonstrations specific to the customer or the one or more demonstrations generic to the customer but specific to at least one of an industry, product, line of business and customer profile of the customer from the selected web-enabled applications including the web-enabled human resources application, the web-enabled accounting application and the web-enabled customer relationship management application, the demo building tool including at least one of a list of selectable solutions, a list of selectable industries, a list of selectable regions and a list of selectable job functions, the building tool being configured to generate the one or more demonstrations specific to the customer or the one or more demonstrations generic to the customer but specific to at least one of an industry, product, line of business and customer profile of the customer from the selected web-enabled applications including the web-enabled human resources application, the web-enabled accounting application and the web-enabled customer relationship management application based upon a selection of at least one of a solution, industry, region and job function by the sales representative and/or the customer.

10. The non-transitory computer-readable storage medium of claim 8 wherein the training and sales Web site further includes at least one tab selected from the group consisting of a "Sales call Online" portion of the Web site, an "Industry" portion of the Web site, a "Lines of Business" portion of the Web site, an "Information Technology" portion of the Web site, a "Products" portion of the Web site and a "Resources" portion of the Web site.

11. The non-transitory computer-readable storage medium of claim 10 wherein each of the portions of the Web site is structured to include the first to fourth sections.

12. The non-transitory computer-readable storage medium of claim 8 wherein the training and sales Web site further includes scripted talking points visible only to the sales representatives, the scripted talking points prompting the sales representatives to communicate information to the customer during the sales call as the sales representatives and the customer navigate through the training and sales Web site.

13. The method of claim 6 wherein the training and sales Web site further includes at least one tab selected from the group consisting of a "Sales call Online" portion of the Web site, an "Industry" portion of the Web site, a "Lines of Business" portion of the Web site, an "Information Technology" portion of the Web site, a "Products" portion of the Web site and a "Resources" portion of the Web site.

14. The method of claim 13 wherein each of the portions of the Web site is structured to include the first to fourth sections.

15. The method of claim 6 wherein the training and sales Web site further includes scripted talking points visible only to the sales representatives, the scripted talking points prompting the sales representatives to communicate information to the customer during the sales call as the sales representatives and the customer navigate through the training and sales Web site.

16. The method of claim 6 wherein posting the one or more demonstrations specific to the customer generated from the selected web-enabled applications including the web-enabled human resources application, the web-enabled accounting application and the web-enabled customer relationship management application to the third section of the Web site comprises posting a hyperlink configured to access the customized selected web-enabled applications including the web-enabled human resources application, the web-enabled accounting application and the web-enabled customer relationship management application on the same page as one or more links to literature related to the selected web-enabled applications including the web-enabled human resources application, the web-enabled accounting application and the web-enabled customer relationship management application.

17. The method of claim 6 wherein posting the one or more demonstrations specific to the customer generated from the selected web-enabled applications including the web-enabled human resources application, the web-enabled accounting application and the web-enabled customer relationship management application to the third section of the Web site comprises posting one or more links configured to access the customized selected web-enabled applications including the web-enabled human resources application, the web-enabled accounting application and the web-enabled customer relationship management application on the same page as one or more links to the one or more demonstrations generic to the customer but specific to at least one of an industry, product, line of business and customer profile of the customer of a the web-enabled applications including the web-enabled human resources application, the web-enabled accounting application and the web-enabled customer relationship management application.

* * * * *

UNITED STATES PATENT AND TRADEMARK OFFICE
CERTIFICATE OF CORRECTION

| | | |
|---|---|---|
| PATENT NO. | : 7,922,493 B1 | Page 1 of 1 |
| APPLICATION NO. | : 10/370552 | |
| DATED | : April 12, 2011 | |
| INVENTOR(S) | : Gennaro et al. | |

It is certified that error appears in the above-identified patent and that said Letters Patent is hereby corrected as shown below:

In column 17, line 44, in Claim 6, after "of" insert -- the --.

In column 19, line 17, in Claim 6, delete "computers" and insert -- computers, --, therefor.

In column 21, line 29, in Claim 8, before "generic" delete "that are".

In column 24, line 46, in Claim 17, after "of" delete "a".

Signed and Sealed this
Eighteenth Day of October, 2011

David J. Kappos
*Director of the United States Patent and Trademark Office*